United States Patent Office 3,825,564
Patented July 23, 1974

3,825,564
ANTHRAQUINONE SULFONIC ACIDS
Wolfgang Schoenauer, Riehen, Switzerland, and Roland Wald, Pfetterhouse, France, assignors to Sandoz Ltd., Basel, Switzerland
No Drawing. Filed Aug. 3, 1971, Ser. No. 175,784
Claims priority, application Switzerland, Aug. 12, 1970, 12,093/70; Nov. 13, 1970, 16,797/70
Int. Cl. C09b 1/30, 1/34
U.S. Cl. 260—372
19 Claims

ABSTRACT OF THE DISCLOSURE

Anthraquinones bearing in the 1 and 4 positions secondary amino groups and in the 6 position an aminocarbonyl group and containing at least one $SO_3H$ group give brilliant dyeings and prints of green to blue shades and of good fastness.

---

This invention relates to acid, water soluble, substituted 1,4-diaminoanthraquinone - 6 - carboxylic acid amides whose acid properties are imparted by sulphone or sulphato groups in the molecule.

This invention relates in particular to anthraquinone compounds containing $SO_3H$ groups which are of formula

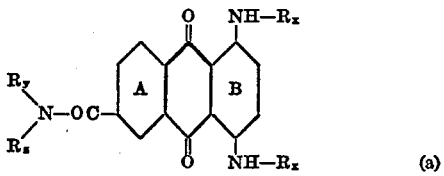

(a)

where each $R_x$ stands for an unsubstituted or substituted hydrocarbon radical,
$R_y$ and $R_z$ each stands for hydrogen or an unsubstituted or substituted hydrocarbon radical,
and in which the $SO_3H$ groups may be present as sulphonic acid and/or as sulphato groups and the rings A and B may be further substituted.

Specifically, the invention is directed to new and valuable anthraquinone compounds of the general formula

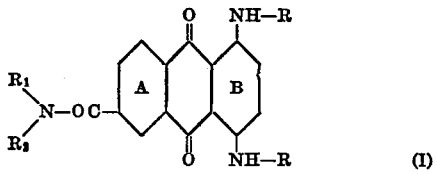

(I)

where each R represents a substituted or unsubstituted alkyl radical which has more than 3 carbon atoms or a substituted or unsubsituted aryl or cycloalkyl radical or a group of formula $$-X-R_3 \quad (II)$$

$R_1$ and $R_2$ each represents hydrogen or a substituted or unsubstituted hydrocarbon radical which may be substituted, and where at least one group of formula $$-X_1-O-SO_3H \quad (III)$$

or $$-X_1-SO_3H \quad (IV)$$

is present in the radical R, $R_1$ or $R_2$.

The rings A and/or B in formula (I) may be further substituted and $R_1$ and $R_2$ may form, jointly with the vicinal N atom, a heterocyclic ring.

X stands for a straight or branched, substituted or unsubstituted alkylene radical which has 1 to 3 carbon atoms,
$X_1$ for a straight or branched, optionally cyclized substituted or unsubstituted alkylene radical, and
$R_3$ for a substituted or unsubstituted aryl or cycloalkyl radical, halogen, hydroxyl, carboxyl, cyano, a substituted or unsubstituted amino group, a substituted or unsubstituted etherified hydroxyl group, a substituted or unsubstituted ester group or a substituted or unsubstituted carboxylic acid amide group.

The aforenamed anthraquinone compounds can be produced by several different methods. One method consists in the reaction of a compound or the leuco form of a compound of formula

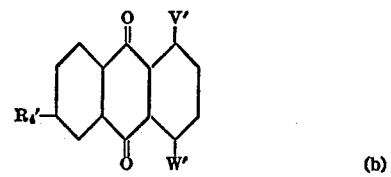

(b)

where V' and W' stand for halogen or radicals reacting with amino groups or $-NH-R_x$ and
$R_4'$ for a carboxylic acid or a functional derivative of a carboxylic acid or a radical of formula

(c)

with 2 mols of an amine of formula $$R_x-NH_2 \quad (d)$$

if V' and W' represent halogen or radicals reacting with amino groups or with a compound of formula

(e)

if $R_4'$ represents a carboxylic acid or a functional derivative of a carboxylic acid and
V' and W' represent $NH-R_x$ radicals,
followed by oxidation of the resulting leuco compound if this is necessary and by treatment with an agent yielding $SO_3$.

Another method consists in reacting a compound or the leuco form of a compound of formula

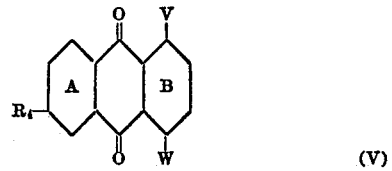

(V)

where V and W represent halogen or radicals reacting with amino groups or $-NH-R$ and
$R_4$ a carboxylic acid or a functional derivative of a carboxylic acid or a radical of formula

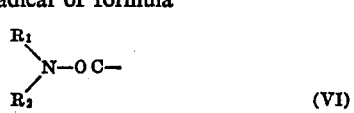

(VI)

either with 2 moles of an amine of formula $$R-NH_2 \quad (VII)$$

if V and W stand for halogen or radicals reacting with amino groups, or with an amine of formula

(VIII)

if $R_4$ stands for a carboxylic acid or a functional derivative of a carboxylic acid and V and W for radicals $-NH-R$, with subsequent oxidation of the resulting compound if necessary.

This method and the methods described in the following can be employed to produce compounds of formula

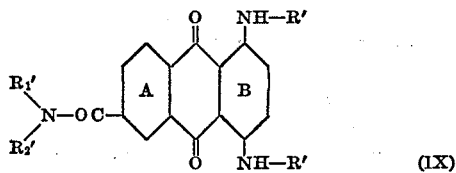

or

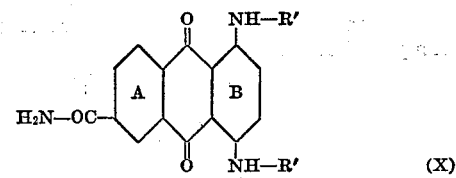

where R', $R_1'$ and $R_2'$ each stands for a substituted or unsubstituted hydrocarbon radical, or $R_1'$ and $R_2'$ jointly with the N atom stand for a substituted or unsubstituted, saturated or partially saturated heterocycle.

Another method of producing compounds of formula (IX) consists in reacting a compound or the leuco form of a compound of formula

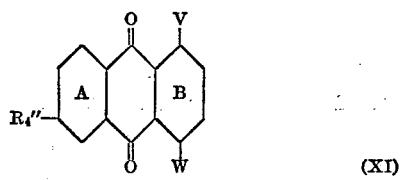

where $R_4''$ represents a carboxylic acid or a functional derivative of a carboxylic acid or a radical of formula

either with 2 mols of an amine of formula $$R'—NH_2 \qquad (XIII)$$

if V and W stand for halogen or radicals reacting with amino groups, or with an amine of formula

if $R_4''$ stands for a carboxylic acid or a functional derivative of a carboxylic acid and V and W for a radical of formula —NH—R', with subsequent oxidation of the resulting compound if necessary.

The compounds of formula (X) can be produced, for example, by reacting a compound of formula

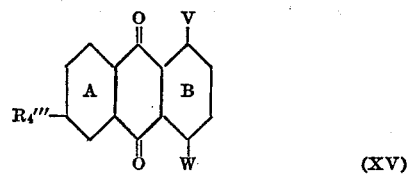

where $R_4'''$ represents a carboxylic acid or a functional derivative of a carboxylic acid or a radical of formula $$H_2N—OC— \qquad (XVI)$$

either with 2 mols of an amine of formula (XVIII), if V and W stand for halogen or radicals reacting with amino groups, or with ammonia, if $R_4'''$ stands for a carboxylic acid or a functional derivative of a carboxylic acid and V and W for a radical of formula —NH—R', with subsequent oxidation of the resulting compound if necessary.

Anthraquinone compounds of formula

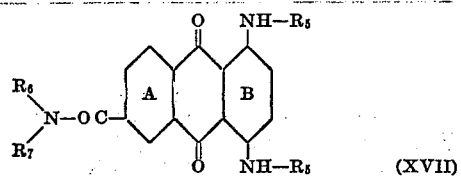

where each $R_5$ stands for a substituted or unsubstituted alkyl radical having more than 3 carbon atoms or a substituted or unsubstituted cycloalkyl radical or a group of formula $$—X—R_8 \qquad (XVIII)$$

$R_6$ for hydrogen, a substituted or unsubstituted alkyl or cycloalkyl radical, $R_7$ for an aryl radical or a group of formula $$—X_1—OH \qquad (XIX)$$

and $R_8$ for a substituted or unsubstituted cyclohexyl radical, can be used for the production of compounds of formulae

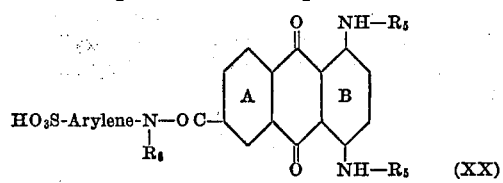

or

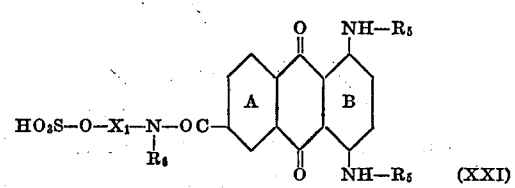

where $X_1$ represents an unsubstituted or substituted, straight or branched alkylene radical, by sulphonating or sulphating a compound of formula (XVII).

The aforedescribed methods can be used to produce compounds of formulae

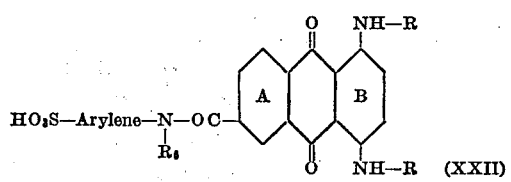

and

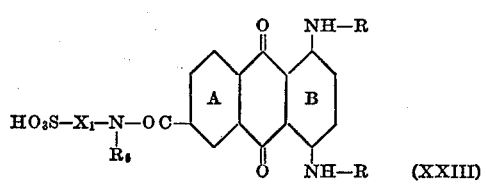

Compounds of formula

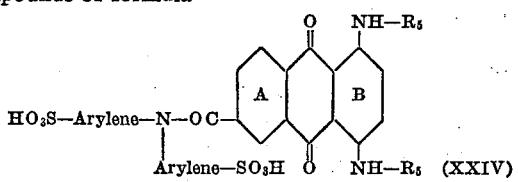

or

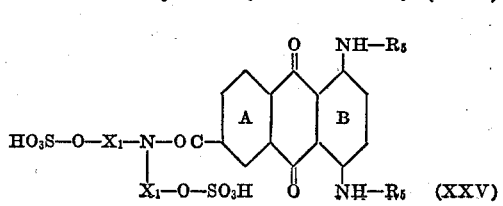

can be obtained by sulphonation or sulphation of a compound of formula

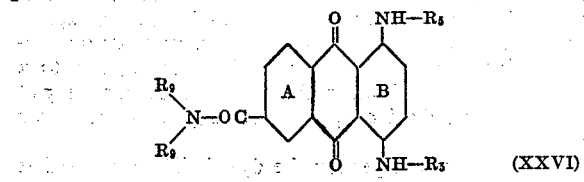

(XXVI)

where each $R_9$ represents an aryl radical or a group of formula $$-X_1-OH \quad (XXVII)$$

Compounds of formula

 (XXVIII)

where each $R_{10}$ represents a substituted or unsubstituted arylene radical, can be produced by sulphonating a compound of formula

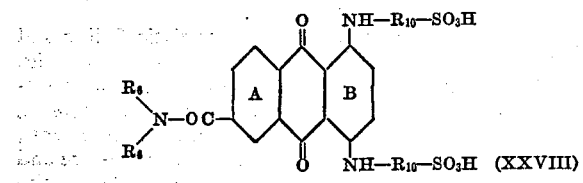 (XXIX)

Compounds of formula

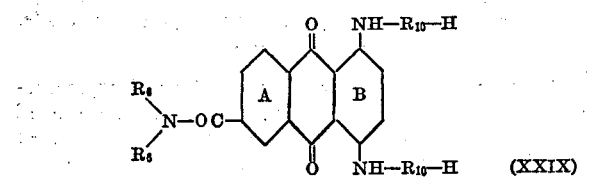 (XXX)

can be produced by sulphation of a compound of formula

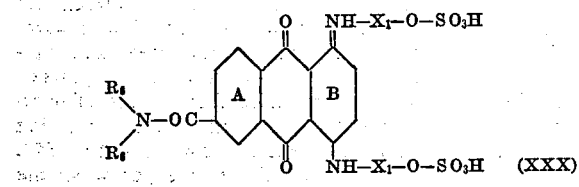 (XXXI)

The present process can be employed to produce compounds of the formulae

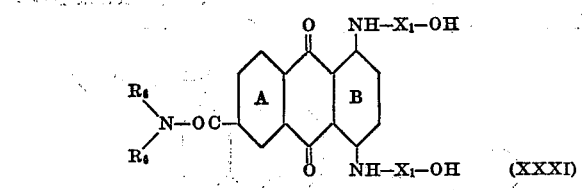 (XXXII)

or

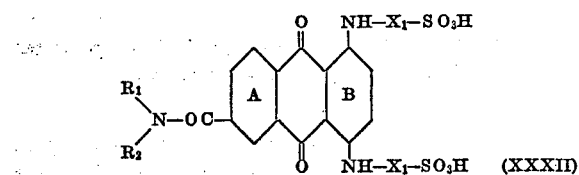 (XXXIII)

where each $R_{11}$ stands for the radical R' or preferably R or $R_5$.

The process can also be used to produce compounds of the formulae

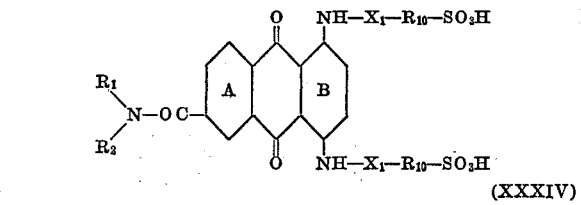 (XXXIV)

and

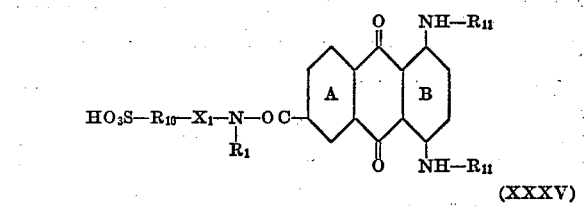 (XXXV)

Particularly good dyes correspond to formula

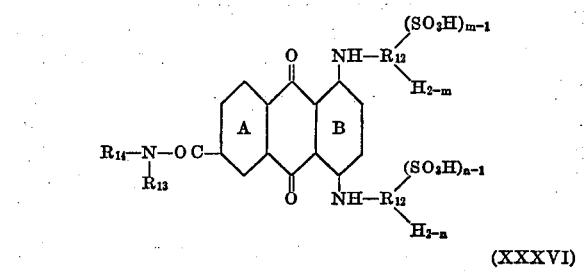 (XXXVI)

where $R_{12}$ stands for

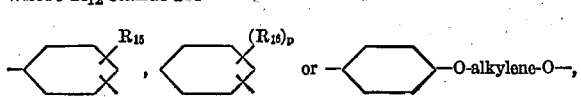

$R_{13}$ for hydrogen, alkyl having 1 to 4 carbon atoms or phenyl, $R_{14}$ for hydrogen, alkyl having 1 to 8 carbon atoms, cyclohexyl, mono-, di- or tri-methylcyclohexyl, ethylcyclohexyl or $$-R_{12}' \genfrac{}{}{0pt}{}{(SO_3H)_{q-1}}{H_{2-q}}$$

$R_{12}'$ independently of $R_{12}$ for the radicals named for $R_{12}$,
$R_{15}$ for hydrogen, hydroxy, chlorine, alkyl having 1 to 4 carbon atoms, alkoxy having 1 to 4 carbon atoms, phenyl or phenoxy,
$R_{16}$ for methyl or ethyl,
$m$ for 1 or 2,
$n$ for 1 or 2,
$p$ for 2 or 3 and
$q$ for 1 or 2, where the sum of $m$ and $n$ is 3 or 4 and alkylene contains 2 or 3 carbon atoms.

Dyes of formula (XXXVI) which bear on the average 1.2 to 1.8 sulphonic acid groups are especially preferred.

Further preferred dyes correspond to formula

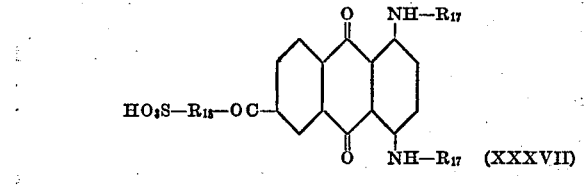 (XXXVII)

where $R_{17}$ stands for cyclohexyl, mono-, di- or tri-methylcyclohexyl, ethylcyclohexyl, or an open-chain secondary alkyl radical containing 1 to 9 or preferably 4 to 9 carbon atoms,
$R_{18}$ for

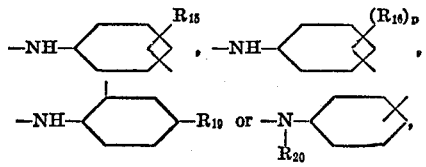

$R_{19}$ for phenyl, phenoxy or alkyl having 5 to 12 carbon atoms and
$R_{20}$ for alkyl having 1 to 4 carbon atoms or phenyl.

The compounds of formula (V) can be reacted with an amine of formula (VII) or (VIII) by methods know per se, e.g. at 40–150° C. Similarly the other reactions can be carried out by methods known per se, for example in accordance with the teaching of French Pat. 1,536,591 or Belgian Pat. 731,013. For the formation of the water soluble anthraquinone compounds it is best to employ an aqueous or aqueous-organic medium e.g. at 45–150° C. The water insoluble and sparingly water soluble compounds are produced preferably in organic medium, e.g. at 50–200° C.

Suitable organic solvents which, if desired, can be mixed with water include alcohols such as methanol, ethanol, butanol and iso-propanol, ethers such as dioxane, alcohol ethers, ketones such as acetone and methylethylketone.

In the foregoing "halogen" stands preferably for chlorine, bromine or fluorine. The hydrocarbon radicals are mainly alkyl aryl, aralkyl, or cycloalkyl radicals. Alkyl radicals may contain advantageously 1 to 12, 1 to 6 or preferably 1 to 4 carbon atoms. Alkoxy radicals usually contain 1 to 4 carbon atoms. The alkyl radicals may be straight or branched and may be substituted, e.g. by halogen, hydroxyl, cyano or aryl, or they may stand for aralkyl radicals such as benzyl radicals. Aryl radicals are preferably phenyl radicals but may be naphthyl or tetrahydronaphthyl radicals. The rings A and/or B and the aryl and arylene radicals may be substituted by halogen, hydroxyl, cyano, alkyl, alkoxy, nitro, trifluoralkyl, trichloralkyl, amino, —$SO_3H$, —$COOH$ etc. The radicals reacting with amino groups include hydroxyl, alkoxy, amino, nitro and sulphonic acid groups. The alkylene radicals X may be interrupted by hetero atoms or groups of hetero atoms and usually contain 1 to 12 or preferably 1 to 8 carbon atoms. The alkylene radicals $X_1$ usually contain 1 to 12 carbon atoms; they may be straight or branched and optionally cyclized and may also be interrupted by hetero atoms or groups of hetero atoms. The functional derivatives of carboxylic acids include the halides, esters and amides. The compounds of formula (X) are generally employed in the leuco form if V and W represent radicals reacting with amino groups.

The new dyes which contain an anionic, water solubilizing group are used primarily for the dyeing and printing of textiles of natural polyamide, synthetic polyamide and polyurethane fibres. The principal natural polyamide fibres are wool and silk. The synthetic polyamide fibres are the products of condensation polymerization of ω-aminocarboxylic acids or their lactams, e.g. ω-laurin-lactam, 11-aminoundecancarboxylic acid, 7-aminoenanthic acid or ε-caprolactam (polyamides 12, 11, 7 and 6), the condensation polymerization products of dibasic organic acids such as dicarboxylic acids (adipic, sebacic acid) and diamines (hexamethylene diamine), (polyamides 66 and 610), or the copolymerization products of ε-caprolactam, adipic acid and hexamethylene diamine (polyamide 66.6). They may be present as yarn, woven or knitted fabrics or in other forms.

On the aforenamed fibres the compounds of formula (I) have good light and wet fastness, including fastness to washing, water, perspiration, acid, alkali, rubbing, milling and pressing.

The new compounds of formula (I) may be converted into dyeing preparations by one of the standard methods such as grinding in the presence of dispersing agents and/or fillers, with subsequent vacuum or atomizer drying if dry preparations are desired. After addition to a suitable volume of water the preparations can be pad dyed, exhaust dyed or printed at long or short liquor ratios.

From aqueous dispersion the dyes build up on textiles of synthetic or regenerated organic fibres of high molecular weight and hydrophobic character. They are particularly suitable for dyeing and printing linear aromatic polyester, cellulose acetate, cellulose triacetate and polyamide fibres, and are also dyeable on polyolefins. The known dyeing and printing methods are used, such as the process described in French Pat. 1,445,371.

The dyeings and prints show no catalytic fading and have good all-round fastness including fastness to light, heat (sublimation, thermofixation, pleating) and wet treatments (water, sea water, washing, perspiration, solvents, dry cleaning), with similarly good fastness to lubricants, rubbing, and cross dyeing. They are stable to pre-cure and post-cure permanent press finishing and soil released finishes. The reserve of wool and cotton is good, and they withstand reducing action in the dyeing of textiles containing wool.

In the following Examples the parts and percentages are by weight and the temperatures in degrees centigrade.

EXAMPLE 1

At room temperature 44 parts of 1,4-dihydroxyanthraquinone-6-carboxylic acid in the leuco form are entered into 160 parts of cyclohexylamine. The mixture is raised to 100–110° under a nitrogen atmosphere and reacted for 5 hours, after which the nitrogen is replaced by an air current to oxidize the leuco constituent. The reaction mixture is discharged into 600 parts of 10% hydrochloric acid and the product filtered, washed neutral with water and dried at 100°. 30 parts of 1,4-dicyclohexylaminoanthraquinone-6-carboxylic acid are dissolved in 120 parts of aminobenzene at room temperature, then 10 parts of phosphorus trichloride are dropped in at 40°. The reaction mixture is raised to 60° and reacted for 4 hours at 60–65°. Then 200 parts of methyl alcohol are added, on which the dye base settles out in crystalline form. It is filtered, washed with methyl alcohol and water, and dried at 100°. The blue crystalline dye has the formula

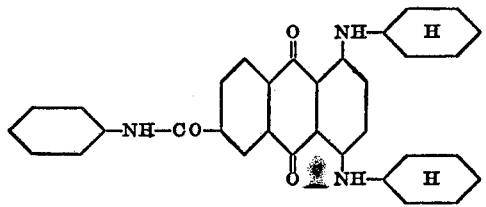

(XXXVIII)

It gives level, fast dyeing of the blue shade on polyester fibres which have good light and wet fastness.

EXAMPLE 1A

At room temperature a solution of 21 parts of 4-chlorocarbonylphthalic anhydride in 50 parts of toluene is run into 100 parts of aniline with stirring, which is continued at 40° for 1 hour after the addition. 100 parts of methyl alcohol are added. A mixture of 2,5- and 2,4-dianilidocarboxybenzoic acid settles out in crystalline form, which is filtered and washed with methyl alcohol and water.

A mixture of 18 parts of dry 2,5- and 2,4-dianilidocarboxybenzoic acid and 5.5 parts of hydroquinone is entered at 180° into 80 parts of a sodium aluminum chloride melt. The reaction mixture is held at 180–185° for 3 hours, after which 400 parts of ice and 75 parts of 30% hydrochloric acid are added for precipitation and the temperature increased to 90–95°. The 6-anilidocarboxy-quinizarine settles out and is filtered, washed with hot water, and dried at 100°. 36 parts of the 6-anilidocarboxy-quinizarine in the leuco form are entered into 160 parts of cyclohexylamine at room temperature, and the mixture raised to 100–110° under a nitrogen atmosphere. After working up as in Example 1 a clear crystalline dye is obtained which conforms to the formula shown above.

EXAMPLE 2

20 parts of the dye produced as in Example 1 are dissolved at 15° in 50 parts of 100% sulphuric acid and 30 parts of 25% oleum. After 5 hours sulphonation is complete. The mixture is run into a mixture of 150 parts of water and 200 parts of ice to precipitate the dye formed, which has the formula

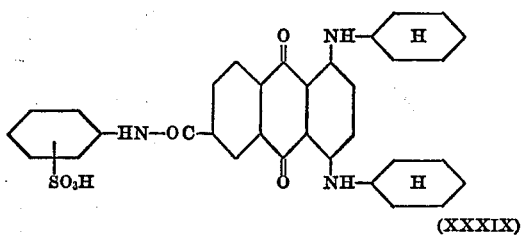

(XXXIX)

The dye is filtered, washed with 5% sodium chloride solution and dried at 100°. It is of brilliant blue shade and gives dyeings of high light and wet fastness on natural and synthetic polyamide fibres.

EXAMPLE 2A

At 15° 20 parts of the 6-anilidocarboxyquinizarine produced as in Example 1 are dissolved in 50 parts of 25% oleum containing 7 parts of boric acid. Sulphonation takes 3 hours to complete. Subsequently the mixture is charged into a mixture of 200 parts of water, 50 parts of sodium chloride and 200 parts of ice. The dye which is of formula

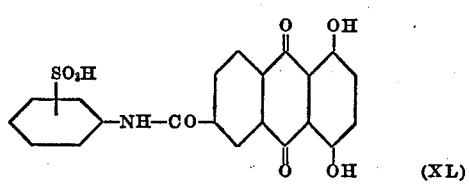

(XL)

settles out. It is filtered off, washed with 10% sodium chloride solution, dissolved in 100 parts of water and converted into the leuco form by treatment with hydrosulphite under a nitrogen atmosphere. Following this, 20 parts of cyclohexylamine are added and the temperature increased to 95°. After reacting for 5 hours the nitrogen current is replaced by an air current to oxidize the leuco constituent. Then 15 parts of 30% hydrochloric acid are added causing precipitation of the dye, which is filtered, washed with 5% sodium chloride solution, and dried at 100°. The blue crystalline dye corresponds to the formula (XXXIX).

EXAMPLE 3

15 parts of 1,4-dicyclohexylaminoanthraquinone-6-carboxylic acid are dissolved in 70 parts of N-methylaminobenzene at room temperature, and 5 parts of phosphorus trichloride are dropped into the solution at 40°. The temperature of the reaction mixture is increased to 60° and it is held at 60–55° for 4 hours. Afterwards it is run into 450 parts of 10% hydrochloric acid and the precipitated product is filtered off, washed neutral with water and dried at 100°. The blue crystalline dye has the formula

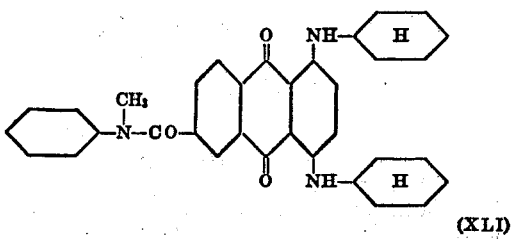

(XLI)

It gives level blue dyeings and prints on polyester fibres which have good light and wet fastness.

EXAMPLE 4

A similar dye to the foregoing is obtained when the N-methylaminobenzene in Example 3 is replaced by 75 parts of N-ethylaminobenzene.

EXAMPLE 5

20 parts of the dye produced as in Example 3 are dissolved in 50 parts of 100% sulphuric acid and 50 parts of 25% oleum at 15°. After 8 hours sulphonation is complete. The mixture is run into a mixture of 200 parts of water and 200 parts of ice. The newly formed dye which has the formula

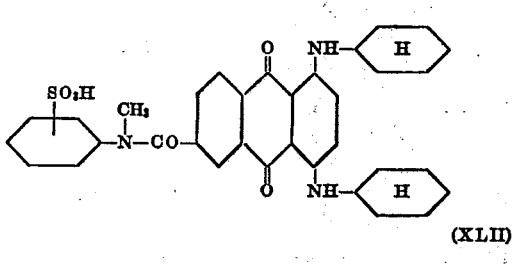

(XLII)

settles out. It is filtered, washed with 5% sodium chloride solution and dried at 100°. A brilliant blue dye is obtained which gives dyeings of high light, wet and rubbing fastness on natural and synthetic polyamide fibres.

EXAMPLE 6

20 parts of the dye produced as in Example 4 are sulphonated as given in Example 5. The dye formed has the formula

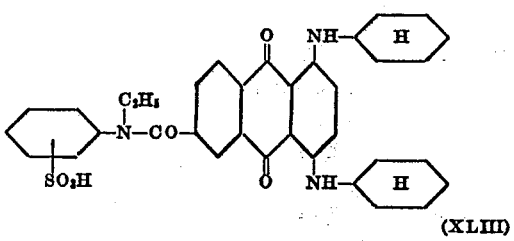

(XLIII)

and dyes natural and synthetic polyamide fibres with good light, wet and rubbing fastness.

The further compounds listed below can be produced by the aforedescribed methods in accordance with this invention:

NOS. 7 TO 17

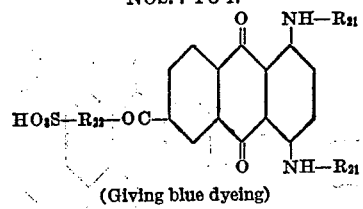

(XLIV)

(Giving blue dyeing)

| No. | R₂₁ | R₂₂ radical of— |
|---|---|---|
| 7 | <phenyl with CH₃, H> | (a) Aniline. (b) N-Methylaniline. (c) N-Ethylaniline. (d) o-Chloraniline. (e) m-Chloraniline. (f) p-Chloraniline. (g) o-Toluidine. (h) m-Toluidine. (i) p-Toluidine. (j) o-Anisidine. (k) m-Anisidine. (l) p-Anisidine. (m) o-Xylidine. (n) m-Xylidine. (o) p-Xylidine. (p) Mesidine. (q) Diphenylamine. (r) p-Amino-diphenyl. (s) 4-Amino-1,1'-diphenylether. (t) 4-Amino-4'-chloro-1,1'-diphenylether. (u) 4-Amino-4'-methyl-1,1'-diphenylether. (v) o-Aminophenol. (w) m-Aminophenol. (x) p-Aminophenol. (y) p-Butylaniline. (z) p-Dodecylaniline. |
| 8 | <phenyl with CH₃, H> | As (a) to (z). |
| 9 | <phenyl with H, CH₃> | Do. |
| 10 | <phenyl with CH₂—CH₃, H> | Do. |
| 11 | <phenyl with H> | As (d) to (z). |
| 12 | <phenyl with CH₃, CH₃, H, CH₃> | As (a) to (z). |
| 13 | —CH(CH₃)₂ | Do. |
| 14 | —CH(CH₂—CH₃)(CH₃) | Do. |
| 15 | —CH(CH₂—CH₃)((CH₂)₃—CH₃) | Do. |
| 16 | —CH(CH₂—CH(CH₃)₂)(CH—CH₃·CH₃) | Do. |
| 17 | —CH(CH₂—CH(CH₃)—CH₃)(CH₂—CH·CH₃) | Do. |

NOS. 18 TO 29

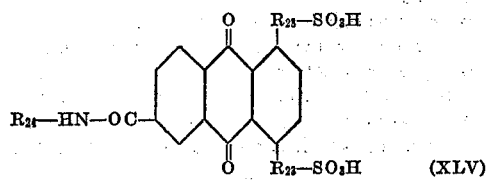

(XLV)

(Giving green dyeings)

| No. | R₂₄ | R₂₃ radical of— |
|---|---|---|
| 18 | <phenyl H> | (a) Aniline. (b) o-Chloraniline. (c) m-Chloraniline. (d) p-Chloraniline. (e) o-Toluidine. (f) m-Toluidine. (g) p-Toluidine. (h) o-Anisidine. (i) m-Anisidine. (j) p-Anisidine. (k) o-Xylidine. (l) m-Xylidine. (m) p-Xylidine. (n) Mesidine. (o) o-Aminophenol. (p) m-Aminophenol. (q) p-Aminophenol. (r) p-Butylaniline. (s) p-Dodecylaniline. |
| 19 | <phenyl CH₃, H, CH₃, CH₃> | As (a) to (s). |
| 20 | <phenyl CH₃, H> | Do. |
| 21 | <phenyl CH₃, H> | Do. |
| 22 | <phenyl H, CH₃> | Do. |
| 23 | <phenyl CH₂—CH₃, H> | Do. |
| 24 | —CH(CH₃)(CH₃) | Do. |
| 25 | —CH(CH₂—CH₃)(CH₃) | Do. |
| 26 | —CH(CH₂—CH₃)((CH₂)₃—CH₃) | Do. |
| 27 | —H | Do. |
| 28 | —CH₃ | Do. |
| 29 | —CH₂—CH₃ | Do. |

NOS. 30 TO 42

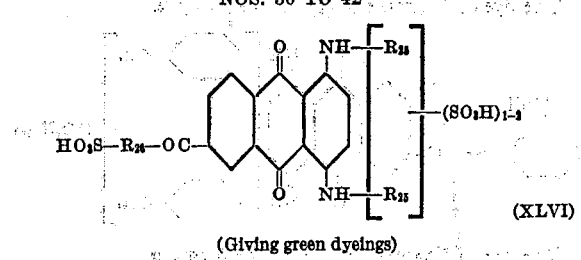

(XLVI)

(Giving green dyeings)

| No. | R₂₅ | R₂₆ radical of— |
|---|---|---|
| 30 | ⬡ | (a) Aniline.<br>(b) o-Chloraniline.<br>(c) m-Chloraniline.<br>(d) p-Chloraniline.<br>(e) o-Toluidine.<br>(f) m-Toluidine.<br>(g) p-Toluidine.<br>(h) o-Anisidine.<br>(i) m-Anisidine.<br>(j) p-Anisidine.<br>(k) o-Xylidine.<br>(l) m-Xylidine.<br>(m) p-Xylidine.<br>(n) Mesidine.<br>(o) o-Aminophenol.<br>(p) m-Aminophenol.<br>(q) p-Aminophenol.<br>(r) p-Butylaniline.<br>(s) p-Dodecylaniline.<br>(t) N-Methylaniline.<br>(u) N-Ethylaniline. |
| 31 | Cl—⬡ | As (a) to (u) in Example 30 |
| 32 | ⬡—Cl (ortho) | Do. |
| 33 | ⬡—Cl | Do. |
| 34 | CH₃—⬡ | Do. |
| 35 | ⬡—CH₃ (ortho) | Do. |
| 36 | ⬡—CH₃ | Do. |
| 37 | CH₃—⬡—CH₃ (with CH₃) | Do. |
| 38 | ⬡—(CH₂)₃CH₃ | Do. |
| 39 | OCH₃—⬡ | Do. |
| 40 | ⬡—OCH₃ (ortho) | Do. |
| 41 | ⬡—OCH₃ | Do. |
| 42 | ⬡—OCH₂CH₂OH | Do. |

APPLICATION EXAMPLE

Two parts of the dye produced as in Example 2 are dissolved in 6000 parts of water at 40° and 4 parts of ammonium sulphate are added to the solution. 100 parts of nylon 66 yarn are entered into this dyebath, the temperature is increased to the boil in 30 minutes and the yarn dyed for 1 hour at this temperature, with subsequent rinsing. The yarn is dyed in a fast brilliant greenish shade. A comparably good dyeing is obtained on wool by this method.

Formulae of representative dyestuffs of the foregoing examples are as follows:

The dye of Example 1, of the formula

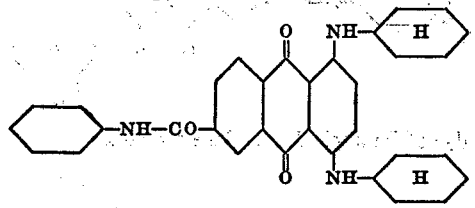

The dye of Example 2, of the formula

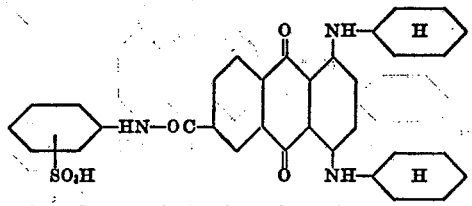

The dye of Example 3, of the formula

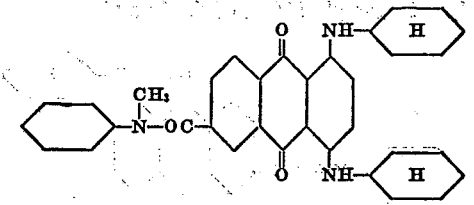

The dye of Example 4, of the formula

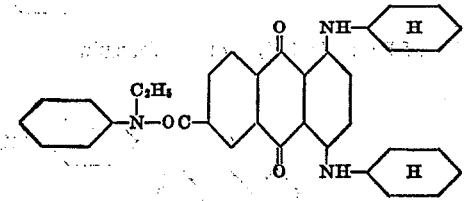

The dye of Example 5, of the formula

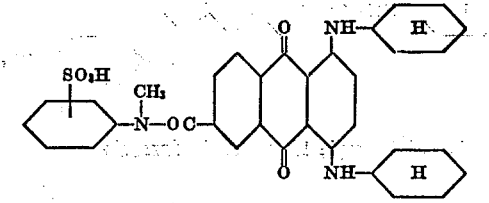

The dye of Example 6, of the formula

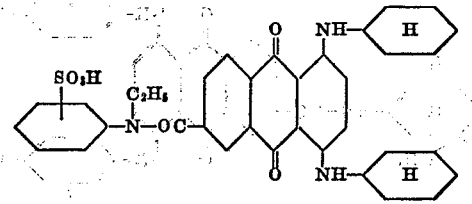

The dye of Example 7(a), of the formula

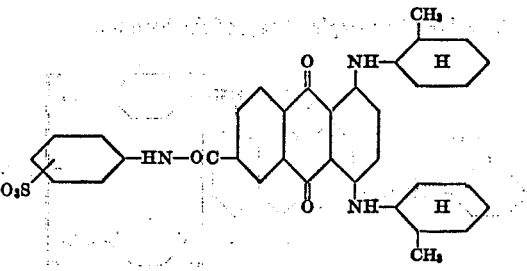

The dye of Example 7(b), of the formula

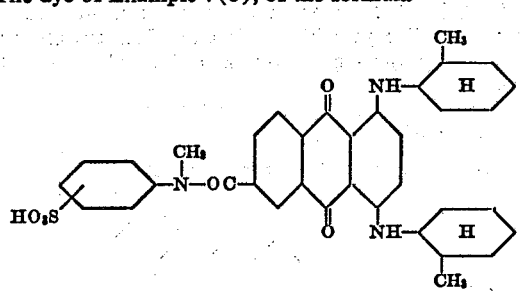

The dye of Example 7(c), of the formula

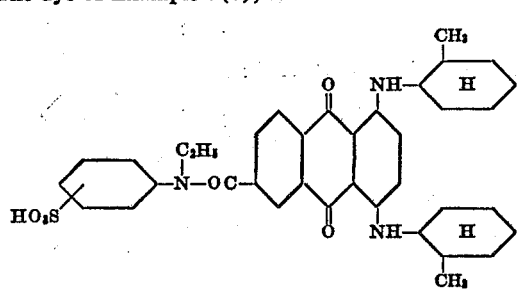

The dye of Example 11(g), of the formula

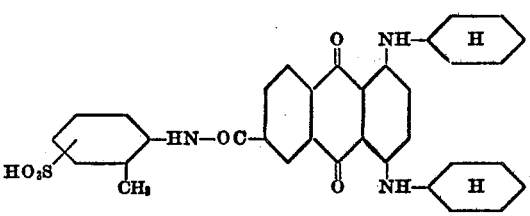

The dye of Example 18(g), of the formula

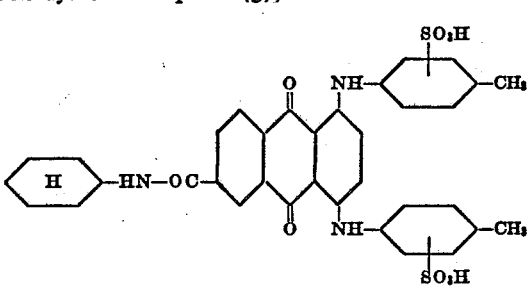

The dye of Example 19(g), of the formula

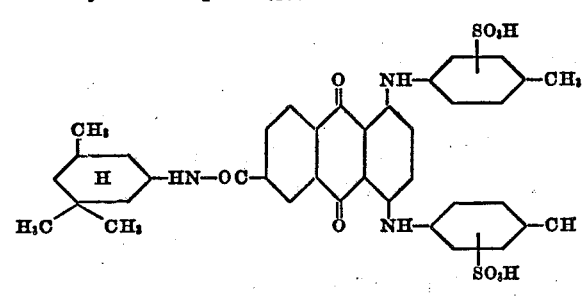

The dye of Example 36(a), of the formula

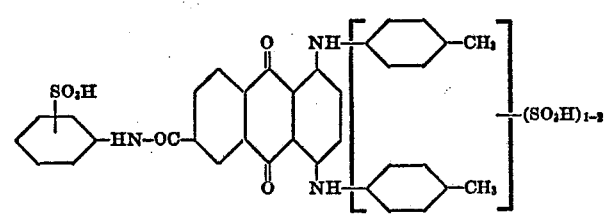

The dye of Example 36(t), of the formula

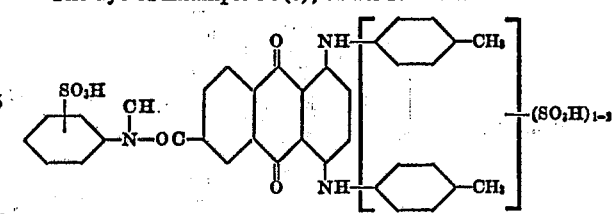

The dye of Example 38(a), of the formula

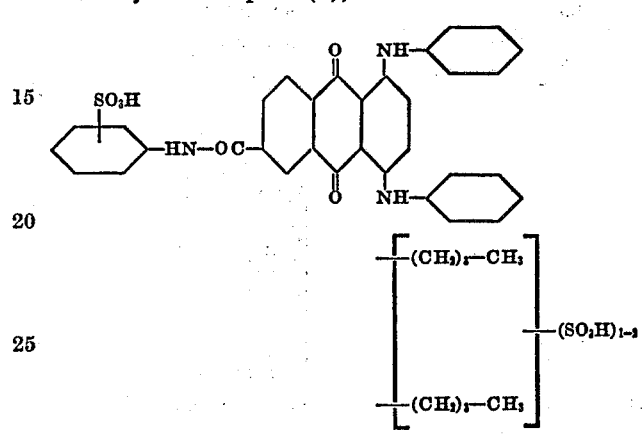

The dye of Example 38(t), of the formula

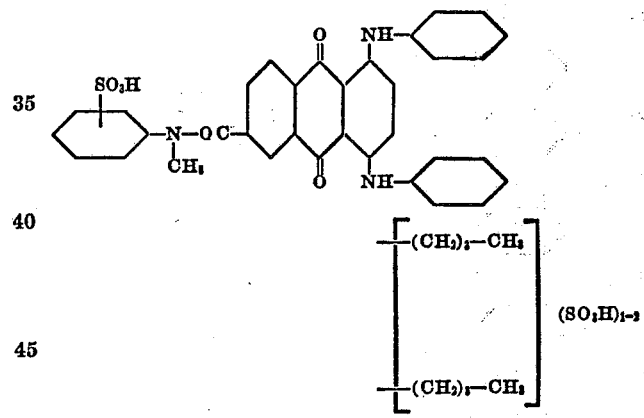

Having thus disclosed the invention what we claim is:
1. A compound of the formula

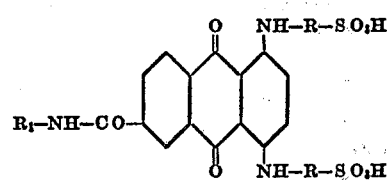

wherein
R is phenylene which may be monosubstituted by chloro, alkyl of 1 to 12 carbon atoms, methoxy, or hydroxy or di- or trisubstituted by methyl or ethyl, and
$R_1$ is hydrogen, alkyl of 1 to 7 carbon atoms or cyclohexyl which may be mono-, di-, or trisubstituted by methyl or monosubstituted by ethyl.
2. A compound of the formula

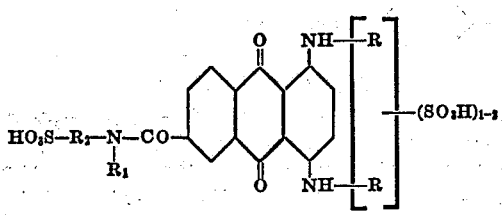

wherein

R is phenyl which may be monosubstituted by chloro, alkyl of 1 to 4 carbon atoms, methoxy, or hydroxyethoxy or di- or trisubstituted by methyl or ethyl,
$R_1$ is hydrogen, methyl or ethyl, and
$R_2$ is phenylene which may be monosubstituted by chloro, alkyl of 1 to 12 carbon atoms, or hydroxy or di- trisubstituted by methyl or ethyl.

3. A compound of the formula

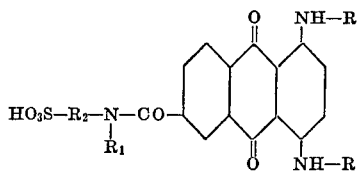

wherein

R is alkyl of 3 to 9 carbon atoms or cyclohexyl which may be mono-, di-, or trisubstituted by methyl or monosubstituted by ethyl,
$R_1$ is hydrogen, methyl or ethyl, and
$R_2$ is phenylene which may be monosubstituted by chloro, alkyl of 1 to 12 carbon atoms, methoxy, phenyl, phenoxy or hydroxy or di- or trisubstituted by methyl or ethyl.

4. A compound according to Claim 1 wherein any alkyl substituent on R is methyl, butyl, or dodecyl; any substituent on $R_1$ when cyclohexyl is methyl; and $R_1$, when alkyl, contains 3 to 7 carbon atoms.

5. A compound according to Claim 2, wherein any alkyl substituent on R is methyl or butyl, and any alkyl substituent on $R_2$ is methyl, butyl or dodecyl.

6. A compound according to Claim 3, wherein any substituent on R, when cyclohexyl, is methyl, and any alkyl substituent on $R_2$ is methyl, butyl or dodecyl.

7. The dye according to Claim 4, of the formula

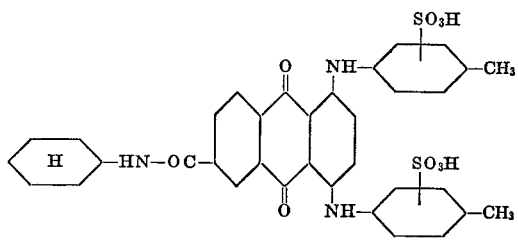

8. The dye according to Claim 4, of the formula

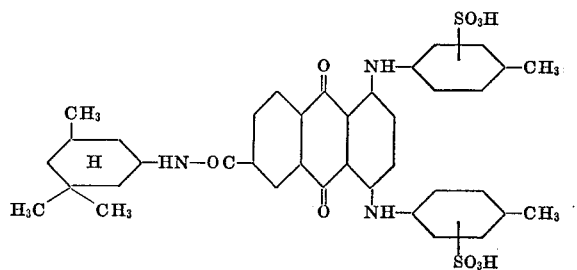

9. The dye according to Claim 5, of the formula

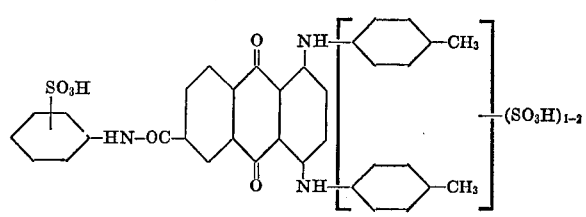

10. The dye according to Claim 5, of the formula

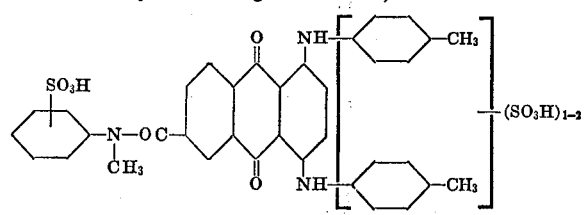

11. The dye according to Claim 5, of the formula

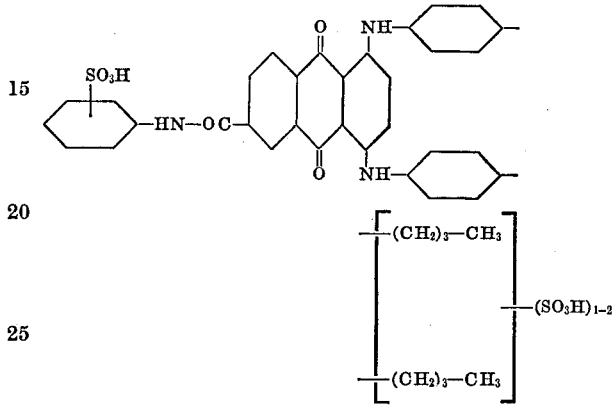

12. The dye according to Claim 5, of the formula

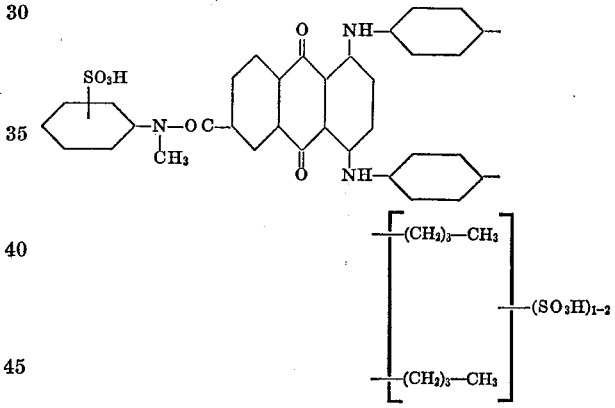

13. The dye according to Claim 6, of the formula

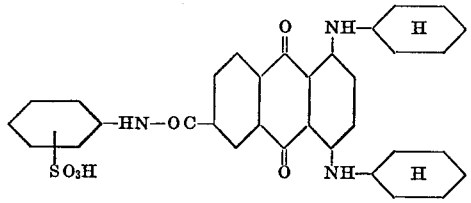

14. The dye according to Claim 6, of the formula

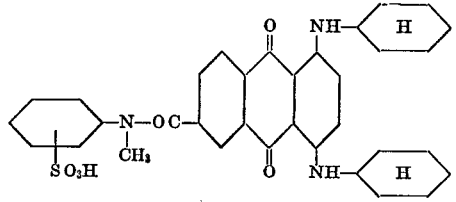

15. The dye according to Claim 6, of the formula

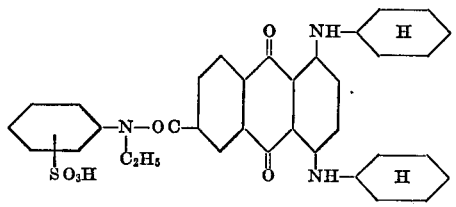

16. The dye according to Claim 6, of the formula
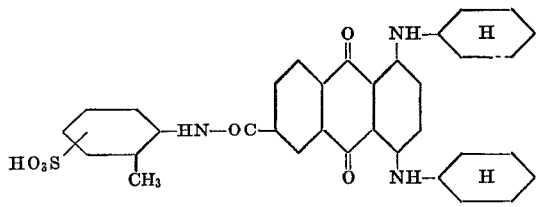
17. The dye according to Claim 6, of the formula
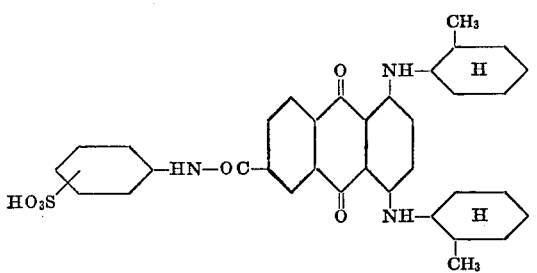
18. The dye according to Claim 6, of the formula
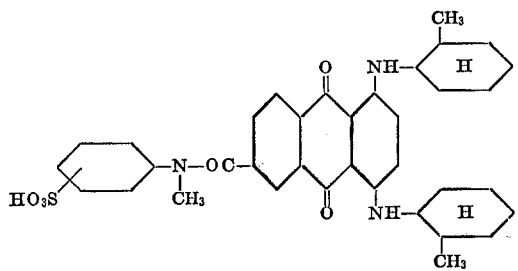
19. The dye according to Claim 6, of the formula
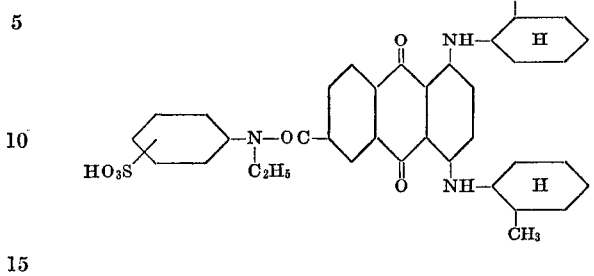
References Cited
UNITED STATES PATENTS
2,059,476   11/1936   Nawiasky et al. _____ 260—372
FOREIGN PATENTS
1,536,591   6/1968   France.
731,013   7/1968   Belgium.
LORRAINE A. WEINBERGER, Primary Examiner
E. J. SKELLY, Assistant Examiner
U.S. Cl. X.R.
8—39; 260—377